(12) United States Patent
Fehrenbach et al.

(10) Patent No.: US 6,987,481 B2
(45) Date of Patent: Jan. 17, 2006

(54) RADAR FILLING LEVEL MEASUREMENT USING CIRCULARLY POLARIZED WAVES

(75) Inventors: Josef Fehrenbach, Haslach (DE); Karl Griessbaum, Muhlenbach (DE)

(73) Assignee: VEGA Grieshaber KG, (DE)

( * ) Notice: Subject to any disclaimer, the term of this patent is extended or adjusted under 35 U.S.C. 154(b) by 0 days.

(21) Appl. No.: 10/423,478

(22) Filed: Apr. 25, 2003

(65) Prior Publication Data

US 2004/0212529 A1    Oct. 28, 2004

(51) Int. Cl.
G01F 23/284    (2006.01)
G01S 13/08    (2006.01)

(52) U.S. Cl. ............ 342/124; 342/118; 342/175; 342/188; 73/290 R; 324/629; 324/631; 324/637

(58) Field of Classification Search .......... 73/290 R, 73/290 B, 304 R, 304 C; 324/629, 631, 324/637–646, 118–146, 149–158, 175, 188; 342/22

See application file for complete search history.

(56) References Cited

U.S. PATENT DOCUMENTS

| 3,568,190 | A | * | 3/1971 | Wong ............... 342/188 |
| 4,458,530 | A |   | 7/1984 | Bastida |
| 5,136,299 | A | * | 8/1992 | Edvardsson ......... 342/124 |
| 5,543,720 | A | * | 8/1996 | Edvardsson ......... 324/643 |
| 5,546,088 | A |   | 8/1996 | Trummer et al. ..... 342/124 |
| 6,759,976 | B1 |  | 7/2004 | Edvardsson |
| 2002/0095987 | A1 | | 7/2002 | Lutke et al. ........ 73/290 |
| 2002/0154052 | A1 | | 10/2002 | Fehrenbach et al. ... 342/124 |

FOREIGN PATENT DOCUMENTS

| DE | 93 12 251.9 | 1/1994 |
| DE | 4334079 C2 | 4/1995 |
| DE | 19803067 A1 | 7/1999 |
| DE | 10023497 A1 | 11/2001 |
| DE | 10102439 A1 | 7/2002 |
| DE | 10102571 A1 | 1/2003 |
| EP | 0060597 A2 | 9/1982 |
| WO | WO-9301474 A1 | 1/1993 |
| WO | WO-0188488 A1 | 11/2001 |
| WO | WO-2004/097347 A2 | 11/2004 |
| WO | WO-0241101 A2 | 5/2005 |

OTHER PUBLICATIONS

"International Search Report in corresponding PCT Application No. PCT/EP2004/003222", (Oct. 26, 2004), 3 pages.

* cited by examiner

Primary Examiner—Bernarr E. Gregory
(74) Attorney, Agent, or Firm—Schwegman, Lundberg, Woessner & Kluth, P.A.

(57) ABSTRACT

The present invention relates to a radar filling level measuring device capable of generating and receiving an elliptically polarized wave and, as a special case, a circularly polarized wave, using a directional coupler which, according to a particular embodiment, may be configured as a 3 dB coupler. By simultaneously using a 3 dB coupler the necessary separation into transmitting and receiving functions can be achieved. Moreover, the present invention relates to a use of a directional coupler for generating an elliptically polarized wave and, as a special case, a circularly polarized wave, as well as to a method for generating and receiving an elliptically polarized wave.

50 Claims, 8 Drawing Sheets

RADAR FILLING LEVEL MEASUREMENT USING CIRCULARLY POLARIZED WAVES

TECHNICAL FIELD

The present invention relates generally to a radar filling level measuring device for the non-contact measurement of a filling level of filling matter in a vessel and in particular to a radar filling level measuring device capable of generating and receiving an elliptically polarized wave or, as a special case, a circularly polarized wave with the aid of a directional coupler which, according to a particular embodiment may be configured as a 3-dB coupler. Moreover, the present invention relates to the use of a directional coupler for generating an elliptically polarized wave or, as a special case, a circularly polarized wave, as well as to a method for generating and receiving elliptically or circularly polarized waves.

BACKGROUND

For the continuous determination of filling levels of liquids or bulk materials in vessels, sensors working, for example, according to the radar principle may be employed. With this method the delay is measured that it takes for the microwaves transmitted by the sensor to cover the distance from the sensor to the filling matter surface and back. The microwaves used, which, for example, may be in a frequency range of between about 1 and 100 GHz, are usually transmitted by an antenna in the form of electromagnetic waves. Then, after reflection by the filling level surface, they are received again by the sensor.

Devices are also known which guide a wave along a wave guide from a sensor to the surface of a filling matter and receive the wave reflected on the filling matter surface using the same path. Both with this method and with methods employing the radar principle, the reflection of the waves on the filling matter surface is due to the change in the propagation impedance of the wave at this point.

For the determination of the desired wave delay, there are various radar principles. One of these is the impulse delay method (pulse radar method), another is the frequency modulated continuous wave (FMCW) radar method. In the FMCW radar method, the delay is determined in an indirect manner by transmitting a frequency modulated signal and creating a difference between the transmitted and the received momentary frequency.

The pulse radar method, on the other hand, uses the radiation of short microwave pulses, also known as bursts, wherein the direct time duration is determined between the transmission and the reception of the individual pulses. From this duration it is then possible to derive the distance between the sensor and the filling matter surface and thus, since the structural position of the sensor in the vessel and the vessel dimensions are known, the vessel filling level.

Usually radar filling level measuring devices transmit linearly polarized microwaves. Linear polarization means that the electrical field intensity vector of the wave is always in the same plane extending along the propagation direction of the wave. The polarization direction of the transmitted wave is therein determined by the structure of the transmitting antenna. If for example a linearly polarized wave is reflected by a filling matter, the polarization direction of the linearly polarized wave does not usually change. If anything, the wave experiences a phase jump of 180°, or $\lambda/2$, which causes the field intensity vector of the wave to be reversed on reflection.

In any case, when a linearly polarized wave is reflected, its polarization direction is maintained, which results in the reflected wave being able to be received by a receiving antenna similar to the transmission antenna. As a result, there need not be separate transmitting and receiving antennas, but instead a single antenna may be used capable of transmitting and receiving microwaves at the same time. Such sensors are also known as monostatic radar systems, characterized on the one hand by their ability to dramatically reduce costs, since it is not necessary to provide two different antennas—one for transmitting and one for receiving. On the other hand, such monostatic radar systems have a relatively small structural size so that there is no unnecessary waste of space, which is usually limited by the existing vessel openings for mounting the filling level sensor.

With the simultaneous use of a single antenna for both transmitting and receiving, it is, however, necessary to separate the electrical transmitting signals sent from the microwave generator to the antenna and the receiving signals sent back from the antenna to the microwave receiver. This is the only way to ensure that the transmitting signals from the microwave generator do not directly reach the microwave receiver without ever having been transmitted by the antenna.

Usually this transmitting/receiving separation is carried out by sensors radiating linearly polarized waves, using, for example, a circulator or a directional coupler. These circuit components are connected to each of the microwave generator, the microwave receiver and the antenna, using a single lead, ensuring on the one hand that the signals generated by the microwave generator are essentially sent to the antenna and not directly to the microwave receiver. On the other hand, the reflection signals coming back from the antenna are essentially forwarded to the microwave receiver and not to the microwave generator.

A radar filling level measuring device having a combined transmitting and receiving antenna and using linear polarization can be particularly advantageous in that, in addition to the elimination of a second antenna, a single lead to the antenna, for example, in the form of a coaxial cable having an associated antenna feeding system, is sufficient. This results in a simple structure of the antenna assembly. However, circulators are usually relatively expensive. Much more problematic than the costs associated with these systems, however, are the signal losses resulting from the signal attenuating properties in particular of the directional coupler, which cause the signal-to-noise ratio of the measuring system to be reduced due to signal loss.

Another approach for realizing a transmitting/receiving antenna is the use of an elliptically polarized wave or, as a special case, a circularly polarized wave, instead of a linearly polarized wave. With an elliptically polarized wave, the electromagnetic field intensity vector spirals along the propagation direction in a helix with an elliptical cross section, whereby the field intensity vector results from superimposing two wave components having different amplitudes. In the special case of a circularly polarized wave, the electromagnetic field intensity vector also spirals along the propagation direction. The spiral, however, has a circular cross section and the two wave components combining to form the resulting wave have equal amplitudes. Depending on the sense of rotation of the spiralling, a distinction can be made between clockwise and anticlockwise (i.e., counter-clockwise) circular polarization.

Such elliptical or circular polarization is suitable in particular for radar filling level measurement in tall, relatively narrow vessels since in these applications part of the wave radiated from the antenna does not directly reach the filling matter surface but, due to the non-ideal directional characteristic of the antenna, is laterally deflected by the vessel wall, before it is reflected on the filling matter and reflected back to the antenna causing such indirectly reflected signal components to have slightly longer delays than a signal reflected back directly from the filling matter. Due to the limited local resolution of the systems envisaged here, two echoes having only a small delay difference overlap, which in traditional sensors has the result that the filling matter echo to be evaluated is superimposed with, and interfered by, echoes deflected by the vessel wall, thereby reducing the measuring precision and measuring reliability of the sensor.

This drawback can be solved by radar filling level measuring devices using circularly polarized waves, since such sensors distinguish between various reflection components and may suppress undesirable components such as those deflected by the vessel wall. The reason for this is that a circularly polarized wave changes its sense of rotation so that a twice reflected wave has a sense of rotation opposite to that of a once reflected wave. Since, however, the receiving antenna only receives waves having one sense of rotation, the interfering reflections having an opposite sense of rotation do not reach the microwave receiver and therefore cannot have a negative effect on the measurements.

Furthermore, the use of the circular polarization may be useful for the determination of the filling level of a bulk material in a vessel when the bulk material has an irregular and fissured surface. Linearly polarized waves are reflected from such bulk material surfaces in differing degrees depending on the position of the polarization plane with respect to the surface structure which, in unfavourable bulk material conditions, may even result in a situation where the correctly reflected signal component is so small that a reliable measurement may no longer be guaranteed. If, however, a circularly polarized wave is used in such a case, a reflection may result whose multitude of different components averages out resulting in a reflection of average intensity, which, however, is definitely stronger than that achieved with the use of a simple linearly polarized wave.

A drawback of the prior art radar filling level measuring devices having circular polarization is that to date the generation of a circularly polarized wave has been relatively expensive. It is known, for example, from EP 0 592 584 filed Jun. 26, 1992, that by inserting a dielectric disc within a hollow conductor a wave can be generated with a circular polarization from a linearly polarized wave. However, this additional hollow conductor section in which the dielectric disc has been inserted requires considerable space. Moreover, the practical realization of this approach, only suggested in principle in the document mentioned, requires additional structural measures such as the protection of the hollow conductor cavities against soiling, supporting the structure against high vessel pressures or for the chemical resistance of the assembly, so that this apparatus is of little practical use.

SUMMARY

In view of the problems associated with prior art devices and methods, according to a first aspect of the present invention, a radar filling level measuring device is provided having a directional coupler connected in series with its antenna. Employing said directional coupler, it is possible on the one hand to generate an elliptically polarized wave and, as a special case, a circularly polarized wave with only slightly more complexity than with a radar filling level measuring device having linear polarization. On the other hand, with the simultaneous use of a directional coupler, it is possible to achieve the necessary separation of the transmitting/receiving antenna. Compared with systems having linear polarization, this has the further advantage that on the one hand the cost for a relatively expensive circulator may be saved, and on the other hand the considerable signal attenuation usually caused by a directional coupler can be avoided or greatly reduced.

The structure of the microwave unit of a radar filling level measuring device according to the present invention, allows for the transmission and the reception of an elliptically polarized wave and, as a special case, of a circularly polarized wave, suitable for certain applications of filling level measurement in vessels. By using the circuitry of a directional coupler of the present invention, a simple structure of an antenna assembly may be used. Further, at the same time, the problem of a transmission/reception separation can be solved. This approach is characterized by low attenuation and low cost.

According to the present invention, the generation of an elliptically polarized wave is thus achieved with the aid of a generally known directional coupler having four terminals, with a microwave generator connected to the first terminal, a microwave receiver to the second terminal, and an antenna feed at each of the third and fourth terminals, configured for example as an exciter pin or as a micro strip conductor or as a patch. The wave frequencies used may be of a wide frequency band. However, in the context of a radar based filling level measuring technology, preferably frequencies in the range of between 1 and 100 GHz are suitable, which does not mean that frequencies beyond these limits would not be practicable. Particularly suitable would be frequencies in the range of between about 4 and 8 GHz and about 18 and 28 GHz.

According to the present invention, by coupling an antenna feed both to a third and to a fourth terminal of the directional coupler and by connecting an antenna feed not only to one terminal of the directional coupler, as implemented in prior art radar filling level measuring devices, an elliptically polarized wave and, as a special case, a circularly polarized wave may be generated by superimposing the two linear wave components fed into an antenna using the antenna feed. The directional coupler itself divides the signal components fed in by the microwave generator on the first terminal between the third and fourth terminals, from where the wave components are forwarded to first and second antenna feeds, respectively, for feeding the antenna.

According to a further exemplary embodiment, a so-called 3 dB coupler may be used as a directional coupler, ensuring that the wave generated by the radar filling level measuring device of the present invention has a circular polarization. A feature of the 3 dB coupler is that the wave signals fed into it are divided up into halves for each of the third and fourth terminals of the 3 dB coupler (3 dB=10*log $(L_1/L_2)$, with $L_1$ being the power of the wave signal fed into the directional coupler and $L_2$ the power of one of the wave signals at one of the outputs.)

Of course, other couplers may be used dividing the signals fed into the two terminals in any desired proportion. Such an irregular division of the fed-in wave signal may then result in an elliptically polarized wave. While the use of circularly polarized waves is particularly advantageous in the filling level measuring technology, it is of course also conceivable to use elliptically polarized waves for certain applications.

When a 3 dB coupler is used, a circularly polarized wave can be generated from the wave signals fed into the coupler within the antenna of the radar filling level measuring device. However, this presupposes that the planes of the two linearly polarized waves from which the circularly polarized wave results by superposition, are oriented at right angles to each other. This can be achieved for example by including the two antenna feeds, which are coupled to the third and fourth terminals of the directional coupler, in the antenna at an angle of about 90° to one another. The generation of a circularly polarized wave also requires that the two wave components fed into the antenna by the two antenna feeds are phase offset from each other by λ/4. This can be achieved for example by arranging the terminals of the directional coupler at a phase offset of λ/4 to each other, such as it is common with so-called hybrid ring couplers (cf. e.g. FIG. 4). According to a further embodiment, the phase offset of λ/4 may also be generated using, for example, a so-called rat-race coupler (cf. e.g. FIG. 5), in which the two outputs are not phase offset from each other; the phase offset is generated, however, by leads of different lengths for the antenna feeds, with the lengths differing by λ/4.

If in the context of the present invention a phase offset of, for example, λ/4 or dimensions having a length of λ/4 are mentioned, the person skilled in the art will obviously recognize that other phase offsets or dimensions can also lead to the desired interference phenomena, such as mutual elimination or maximal amplification. In the case of a hybrid ring coupler, this can mean, for example, that the third and fourth terminals do not have to be spaced by λ/4 from one another, but that the two terminals may also be spaced by 3/4λ, 5/4λ, i.e. by (n+1)*λ/4, from one another, wherein n=k*2; k∈N. The same applies to a rat-race coupler in which the leads to the two antenna feeds need not necessarily differ in length by λ/4. Here, the leads to the antenna feeds may also have a difference in length corresponding to a wavelength difference of (n+1)*λ/4, wherein n=k*2; k∈N.

As explained above, it may be particularly advantageous for generating a circularly polarized wave to mount the two antenna feeds in the antenna radially offset from each other by 90°. However, according to a particular embodiment it may turn out to be advantageous to include the antenna feeds in the antenna at a different angle from each other since it may be possible to hereby compensate for a division not exactly halving the wave signals fed into the two outputs or a phase offset of not exactly λ/4.

As can be seen from the preceding explanations with respect to the generation of an elliptically polarized wave and, as an optimal case, a circularly polarized wave, the present invention is based on the idea of using a directional coupler for generating an elliptically or circularly polarized wave. To do this, a second antenna feed has been provided oriented at a predetermined angle radially offset from a first antenna feed, with both the first and the second antenna feed connected to third and fourth terminals, respectively, of the directional coupler. These arrangements are advantageous in that the two output wave signals of both the third and fourth terminals of the directional coupler are used for generating a spacially superimposed wave, which is quite unlike the generation of a linearly polarized wave where, with the aid of a directional coupler, the output signal of the third or the fourth terminal is "wasted" in a resistor and considerable attenuation has to be accepted.

While hybrid ring or rat-race couplers, both of which belong to the group of hybrid couplers and are preferably configured as 3 dB couplers, are particularly suitable for generating an elliptically polarized wave, other directional couplers may, of course, also be used for splitting up the fed-in wave signal into at least two components. Examples for such couplers that can be mentioned here are line couplers of coupled parallel lines, Lange couplers, which belong to the group of line couplers, as well as branch-line couplers, which also belong to the group of hybrid couplers. Furthermore, for example, also two-hole couplers and magic tees, which belong to the group of hollow conductor couplers, as well as certain coaxial-line couplers may be used. In view of the present invention, however, the person skilled in the art will recognize that any other directional coupler may also be used capable of generating a split wave signal.

According to an advantageous further development of the invention, the directional coupler may be designed together with the leads for the antenna, the antenna feeds, and perhaps further circuit components, such as a microwave generator and a microwave receiver, on a single printed circuit board. A design of this sort enables a cheap and compact unit of electronics and mechanical components. While approaches have already been described (for example in DE 100 23 497) filed May 13, 2000, for combining a plurality of circuit components together with an antenna lead and an antenna feed on one printed circuit board, unlike the present invention, however, only approaches for a linear wave polarization are disclosed.

According to an exemplary embodiment of the present invention, the microwave signal components can be coupled into the antenna using two hollow conductor couplings, each in the form of an exciter pin in a hollow conductor of a radar filling level measuring device. To generate a circularly polarized wave the exciter pins of the hollow conductor couplings are inserted protruding into the hollow conductor at right angles.

Instead of the antenna being fed via a hollow conductor, another type of antenna feed stipulates the use of a planar or patch antenna to generate an elliptically polarized wave. In contrast to the embodiments described so far, in this approach, at least one rectangular or square patch is fed with microwave signal components tapped at the third and fourth terminals of the directional coupler. To generate a circularly polarized wave, the antenna feeds are disposed at the patch on two sides of the patch at right angles to each other, allowing two linearly polarized waves to be excited with polarization planes at right angles to each other, superimposed on one another at a phase offset of λ/4, or 90°, to form a circularly polarized wave. Of course, it is also possible to use as the antenna two or more similarly constructed patches connected in an array instead of only the one patch.

According to a further aspect of the present invention, a method for generating and receiving an elliptically polarized wave is provided, in which, in a first process step, a microwave signal is generated using a microwave generator. Preferably the microwave signal has a wave frequency in the range of about 1 to 100 GHz and, according to a particular embodiment, a wave frequency in the range of between 4 and 8 GHz or between 18 and 28 GHz. The microwave signal thus generated is then fed to a first terminal in a directional coupler which, according to a particular embodiment, may be configured as a 3 dB coupler. As a particular embodiment of the 3 dB coupler, hybrid ring couplers or rat-race couplers may be mentioned, both of which belong to the group of hybrid couplers. The person skilled in the art will recognize that any suitable directional couplers may be used that are capable of generating two or more output signals from one fed-in wave signal. These include, for example, line couplers of coupled parallel lines, Lange couplers belonging to the group of line couplers, as well as branch-line couplers, which also belong to the group of hybrid couplers. Two-hole couplers and magic tees, which belong to the group of hollow conductor couplers, as well as certain coaxial-line couplers may also be used.

In a further process step, the microwave signal fed into the first terminal of the directional coupler is tapped at the third and fourth terminals of the directional coupler in the form of two microwave signal components generated by the directional coupler. Next, the tapped microwave signal components are forwarded to first and second antenna feeds which generate, in the antenna of a radar filling level measuring device, two linearly polarized waves whose planes of polarization are at right angles to each other. Finally, following this, the microwave signal components are fed into the antenna via the first and second antenna feeds with a phase offset from each other, whereby an elliptically polarized wave is generated by superposition which, when two waves having the same intensity and having a phase offset from one another of $\lambda/4$ are superimposed, is a circularly polarized wave.

According to a particular aspect of the method according to the invention, the phase offset between the two microwave signal components is generated using the directional coupler by tapping the microwave signal components at the third and fourth terminals of the directional coupler at a phase offset of $\lambda/4$ from one another.

According to yet another aspect of the method according to the invention, the phase offset between the fed-in microwave signal components is generated by tapping the two microwave signal components in-phase at the third and fourth terminals of the directional coupler and forwarding them to the first and second antenna feeds using two line sections of differing lengths. Again, in the case of a length difference of $\lambda/4$, a circularly polarized wave is achieved.

According to a further embodiment of the method according to the present invention to generate an elliptically polarized wave, the two microwave signal components are fed into the antenna at right angles to each other using two antenna feeds. Of course, the microwave signal components may also be fed into the antenna at any other angle to each other, in order to compensate, for example, for a non-optimal phase offset between the two components or differing amplitudes.

In a further process step, the elliptically polarized wave thus generated and transmitted may be received with the aid of two antenna feeds inserted protruding into an antenna after reflection, for example on a filling matter, in the form of the microwave signal components which, superimposed, represent the elliptically polarized wave. The wave signal thus received in the form of the microwave signal components is then fed into a directional coupler at its third and fourth terminals and forwarded to a microwave receiving unit via a second terminal of the directional coupler. By appropriately choosing the length dimensions of the lead to the directional coupler and/or the conductor sections of the directional coupler, an elimination of the microwave signal components at the first terminal and a maximum amplification at the second terminal, to which the receiving unit is coupled, can be achieved.

BRIEF DESCRIPTION OF THE DRAWINGS

In the following, to provide a more complete understanding and for further explanation, a plurality of exemplary embodiments of the present invention will be described with reference to the accompanying drawings, in which:

FIG. 1b is a sectional view of the hollow conductor of FIG. 1a;

FIG. 2b is a sectional view of the hollow conductor of FIG. 2a;

FIG. 3b is a sectional view of the hollow conductor of FIG. 3a;

DESCRIPTION OF EXEMPLARY
EMBODIMENTS OF THE INVENTION

Figure 1A:
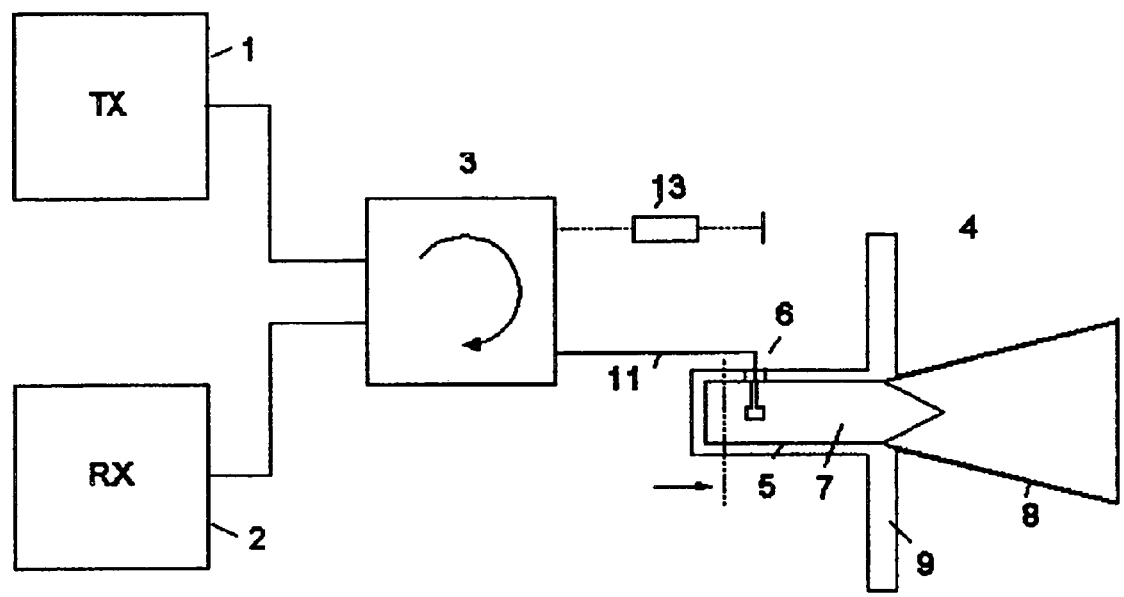
FIG. 1a is a schematic diagram of a prior art microwave circuit arrangement for a radar filling level measuring device with linear polarization.

The microwave circuit arrangement shown schematically in FIG. 1a of a prior art radar filling level measuring device comprises a microwave generator 1 including units for generating a microwave vibration as well as a receiving unit 2 for receiving and then processing wave signals radiated by the antenna horn 8 and reflected by a filling matter surface. For this purpose, the receiving unit 2 includes for example circuits to carry out amplification, frequency conversion, filtering, demodulation or signal compression. The additional circuit units of a fully functional radar filling level measuring device such as a microprocessor circuit for controlling the microwave generator and for evaluating the receiving signal, a circuit for the measuring value output and display or a power supply unit are of lesser importance for the present invention and are therefore not presented or discussed here in any more detail. Such additional circuit units are connectable to the embodiments of the present invention.

The microwave generator 1 and the receiving unit 2 are each connected to a terminal of a unit for transmitting/receiving separation 3. For the concrete design details, reference is made to German patent application DE 101 02 571 filed Jan. 19, 2001, or to the corresponding US patent application publication US 2002095987 A1, filed Feb. 7, 2002, herein incorporated by reference. A third terminal of the transmission/receiving separating unit 3 is connected to the antenna assembly 4. The antenna assembly 4 in the present exemplary embodiment consists of a unilaterally closed hollow conductor 5, a hollow conductor coupling 6, a hollow conductor filling 7, an antenna horn 8 and a flange 9 for attaching the filling level measuring devices to a vessel opening. In order to achieve an impedance matching, the hollow conductor filling 7, which can be made of a dielectric material, may be provided with a taper formed on it along the radiating direction.

Figure 1B:
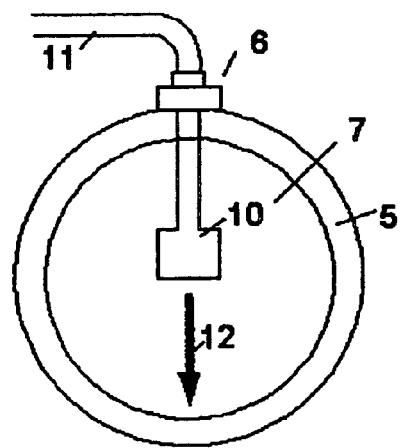

In FIG. 1b, the hollow conductor coupling 6 is shown in an enlarged sectional view of the hollow conductor. An exciter pin 10 with a thickened end is included in the side wall and protrudes through it into the hollow conductor 5 shown here as a round hollow conductor. The exciter pin 10 is fed by the lead 11 with microwave signals ensuring the connection to the transmitting/receiving unit 3. The connection line 11 may also be a coaxial line. During transmission operation, an electromagnetic wave is generated by the exciter pin 10 in the hollow conductor 5 propagating toward the antenna horn 8 and radiated out from the latter in a focused fashion.

On the other hand, during receiving operation, a reflected wave is received by the antenna horn 8 and forwarded as a wave to the exciter pin 10. The latter converts the wave into a line-conducted, wave signal so that it may then be conducted from the line 11 back to the electronics. In FIG. 1b the electrical field intensity vector of the wave is shown as an arrow 12 in a momentary view. It propagates in a plane along the propagation direction, which is why it is called linear polarization. The technical realization of the hollow conductor coupling 6 is generally well known and therefore reference is made only to German utility model DE 93 12 251 U1, filed Dec. 9, 1993.

The transmitting/receiving separation unit 3 essentially forwards the wave signals generated by the microwave generator 1 to the antenna assembly 4, not to the receiving unit 2. Similarly, the receiving signals coming back from the line 11 are essentially sent to the receiving unit 2, not to the microwave generator 1. An ideal component able to fulfil the tasks of the transmitting/receiving separation unit 3 would be a circulator. If considerable attenuation of the signals is accepted, a directional coupler may also be used instead of a circulator, the directional coupler being considerably cheaper than a circulator. However, such directional couplers have the drawback that when generating a linearly polarized wave, they transform part of the generator power in a resistor 13 into heat without using it any further, thereby being inefficient.

Figure 2A:
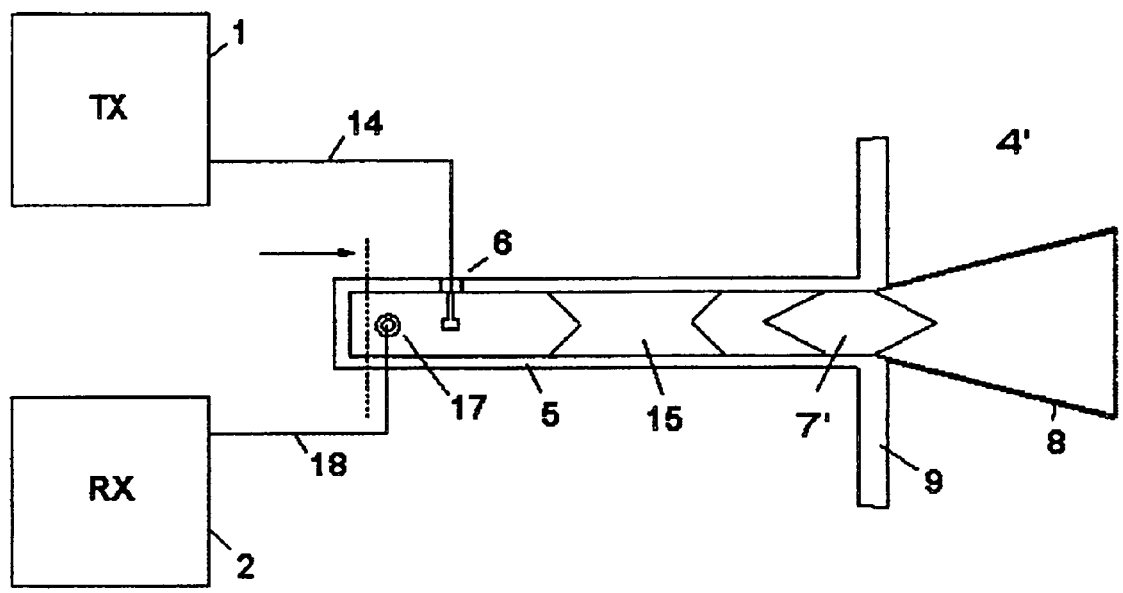
FIG. 2a is a schematic diagram of another prior art microwave circuit arrangement for a radar filling level measuring device with circular polarization.
Figure 2B:
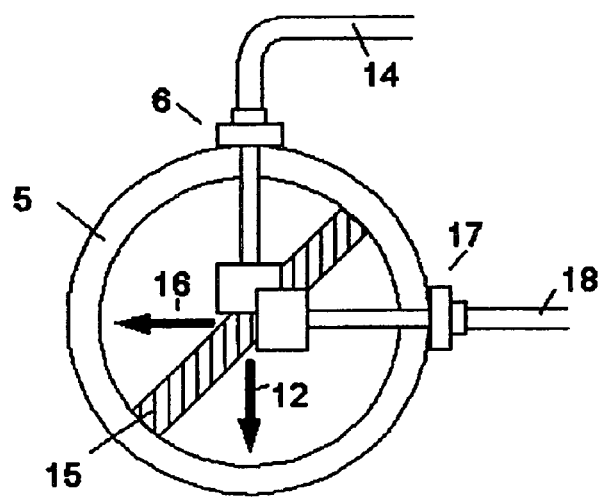

FIGS. 2a and 2b, in analogy to FIGS. 1a and 1b, show a microwave circuit arrangement of a prior art radar filling level measuring device capable of generating a circularly (i.e., non-linearly) polarized wave. Compared to the embodiment as shown in FIG. 1, the antenna assembly 4' has been greatly extended and the transmitting/receiving separation unit 3 has been eliminated. According to this embodiment, the microwave generator 1 is directly linked with the coupling 6 via a line 14, the coupling 6 being essentially configured as in FIG. 1. For this reason, a linearly polarized field vector 12 is also generated propagating in the radiation direction. The wave represented by the field vector 12 is first incident on a dielectric disc 15 included in the hollow conductor at an angle of 45° (cf. FIG. 2b).

According to the laws of vector addition, the linear field intensity 12 may be a combination of two components at right angles to each other, one of which is directed exactly in the direction of the disc 15 while the other is vertical to the disc 15. The component directed in the direction of the disc, while propagating within the disc 15, is delayed compared to the other components by the reduced propagation speed within the dielectric material. If this delay is just 90°, or a quarter of the wavelength, a circularly polarized wave is obtained at the end of the disc 15 by adding the two components.

To improve the impedance matching, the disc has a triangular notch on both sides. The hollow conductor filling 7' also has a tapering adaptation on both sides. The dielectric filling 7' acts to protect the disc 15 and the coupling 6 against contact with the vessel atmosphere.

After reflection, the transmitted circularly polarized wave has a reversed sense of rotation in the propagation direction, as mentioned above. After renewed passage through the dielectric disc 15, again causing differing delays of the linearly polarized components of the wave, the linearly polarized field intensity vector 16 is obtained. The latter may then be received by a second hollow conductor coupling 17, which is constructed corresponding to the first coupling 6, but inserted in the hollow conductor 5 at an offset angle of 90°, and forwarded to the receiving unit 2 via the line 18 as a receiving signal.

In this embodiment for generating a circularly polarized wave, the advantage resides in that the separation of the transmitting and receiving signals is achievable not through an additional circuit but with the structure of the antenna assembly itself. Said embodiment is disadvantageous, however, in that, apart from a necessary second lead to the antenna and accompanying second coupling, the mechanical structure of the hollow conductor and the elements included therein are expensive and very bulky. Moreover, in spite of measures for impedance matching, there are numerous collision surfaces within the hollow conductor liable to cause interfering echoes and therefore to have a negative effect on the quality of measurement.

Figure 3A:
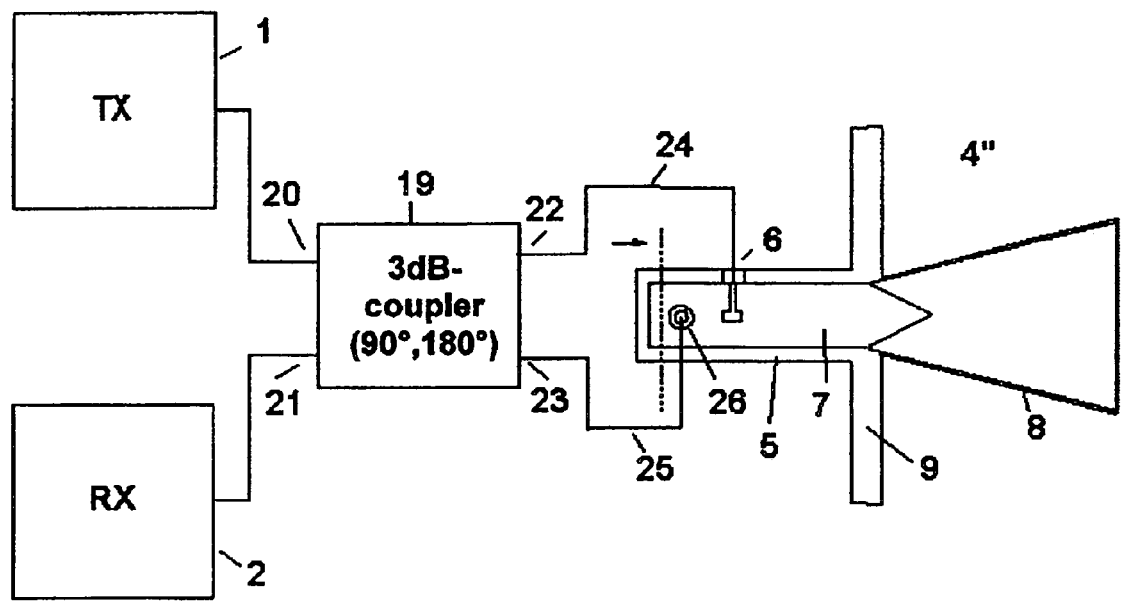
FIG. 3a is a schematic diagram of a microwave circuit arrangement for a radar filling level measuring device with circular polarization according to the present invention.
Figure 3B:
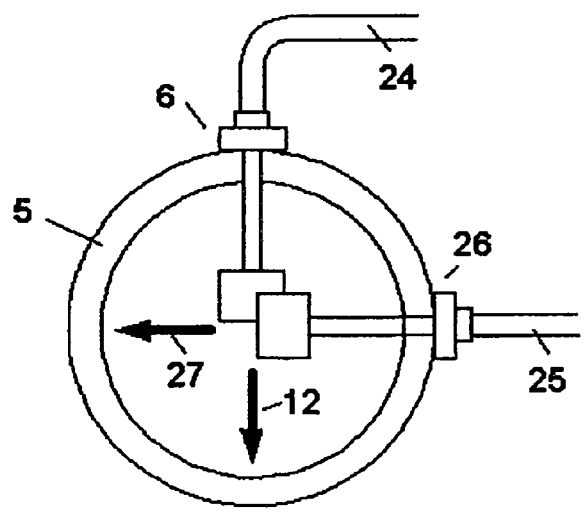

These drawbacks are avoided if the microwave circuit arrangement according to the present invention is used in a radar filling level measuring device having circular polarization as in FIG. 3, in which both the transmitting/receiving separation and the generation of a circularly polarized wave are ensured by using a 3 dB coupler 19. This directional coupler has four terminals 20, 21, 22, and 23 and has the effect of dividing up the signal fed into the first terminal 20 in two halves between each of the third and fourth terminals 22, 23. The second terminal 21 does not receive a signal component since it is uncoupled from the feed-in terminal 20. In a 3 dB coupler, the two terminals 22, 23, between which the signal has been divided, receive equal proportions of power; however there is a phase offset between these two terminals which, depending on the configuration of the coupler, may be 0°, 90° or 180°.

While in the context of the present invention only those embodiments are explained in more detail which cause a division of the wave signal generated by the microwave generator by using a coupler configured as a 90°, or λ/4 coupler configured as a hybrid ring coupler, or a 180° or λ/2 coupler configured as a rat-race coupler, any suitable circuit unit may, of course, be used instead of the couplers mentioned here for dividing up the wave signal, such as the above mentioned strip line coupler, such as line couplers of coupled parallel lines, Lange couplers or branch-line couplers, certain coaxial line couplers or hollow conductor couplers such as two-hole couplers and magic tees.

A microwave signal fed from the microwave generator 1 to the first terminal 20, according to the above embodiments, is equally divided between the third and fourth terminals 22, 23, whereby the phase position of the signal at the fourth terminal 23 is 90° or λ/4 behind the phase position of the signal at the third terminal 22. Both signal components are forwarded to first and second couplings 6, 26 via leads 24, 25 which, similar to the antenna system shown in FIG. 1 or FIG. 2, are included in the hollow conductor 5, for example, at right angles to each other. The couplings 6, 26 which according to the present embodiment are formed as exciter pins, generate two linearly polarized waves represented by the field vectors 12, 27 and superimposed in the hollow conductor 5.

If the delays of the two signal components between the third and fourth terminals 22, 23 are equal up to the point where the components are superimposed, a circularly polarized wave is obtained by the 90° phase difference. In order to ensure equal delays, a possibly existing offset of the two couplings 6, 26 in the longitudinal direction of the hollow conductor must be compensated by differing lengths of the leads 24, 25.

During receiving operation, the linear signal components of the circularly polarized wave, in turn represented by the field intensity vectors 12, 27, are received by the two couplings 6, 26 and transformed into conducted signals. The polarization sense of rotation reversed by the reflection is responsible for the fact that the signal components delivered to the 3 dB coupler 19 via the leads 24, 25 have phase offsets of 90° or $\lambda/4$ with respect to each other. In the present exemplary embodiment, both during reception and transmission, the signal at the fourth terminal 23 lags behind the signal at the third terminal 22 by 90°. Both signal components pass through the 3 dB coupler during reception and are amplified in phase in the second terminal 21 while in the first terminal 20 they are in quadrature phase and therefore eliminate one another.

This means that the objective is achieved of sending the transmitting signals from the microwave generator 1 only to the antenna assembly 4'' and not to the receiving unit 2 while reception signals from the antenna assembly 4'' are only forwarded to the receiving unit 2 and not to the microwave generator 1. This type of transmitting/receiving separation in combination with the generation of circularly polarized waves causes markedly less signal attenuation compared with the approach represented in FIG. 1 and can be constructed with relative ease and in particular at low costs, which will be proven in more detail by the exemplary embodiment shown in FIG. 4.

In this exemplary embodiment (FIG. 4) the entire microwave circuit 1, 2, 19, together with the antenna leads 24, 25 and the couplings 28, 29 is arranged on a single printed circuit board. Both the 3 dB coupler 19, configured here as a hybrid ring coupler, and the different antenna leads 24, 25 are formed using strip conductor technology, such as microstrip leads, so that no additional component costs arise with respect to these circuit components. In the present exemplary embodiment, the 3 dB coupler 19 is arranged as a hybrid ring coupler having four lead portions arranged in a square configuration, each having the length of a quarter of the wavelength $\lambda$. The wave signals for example fed into the first terminal 20 are divided up between the two adjacent lead portions. The one signal component reaches the third terminal 22 after a path length of $\lambda/4$ while both signal components reach the fourth terminal 23 after a path length of $\lambda/2$. Due to these differing path lengths between the first and the third or the fourth terminal, the two signal components have a delay difference of $\lambda/4$, or 90°, at the third and fourth terminals 22, 23, respectively.

The hollow conductor couplings 28, 29 have also been etched on the printed circuit board as copper surfaces and protrude into a metallic hollow body 5. Since the two couplings 28, 29 are in the same plane as the hollow conductor 5, care must be taken, also for the purpose of a correct phase relationship, that the leads 24, 25 have exactly the same length.

Figure 4:
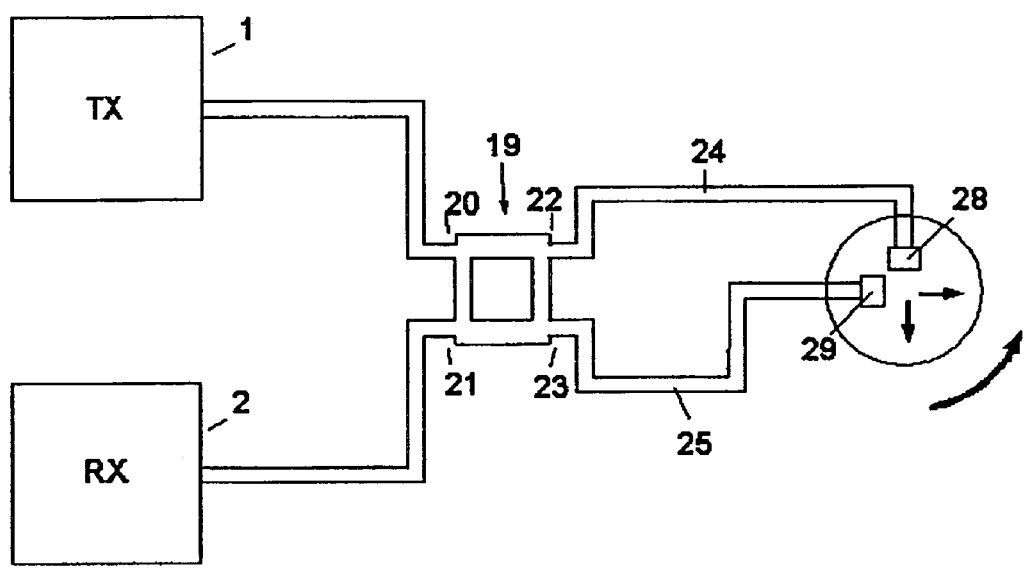
FIG. 4 is a schematic diagram of a further embodiment of the microwave circuit arrangement for a radar filling level measuring device including a hybrid ring coupler according to the present invention.
Figure 5:
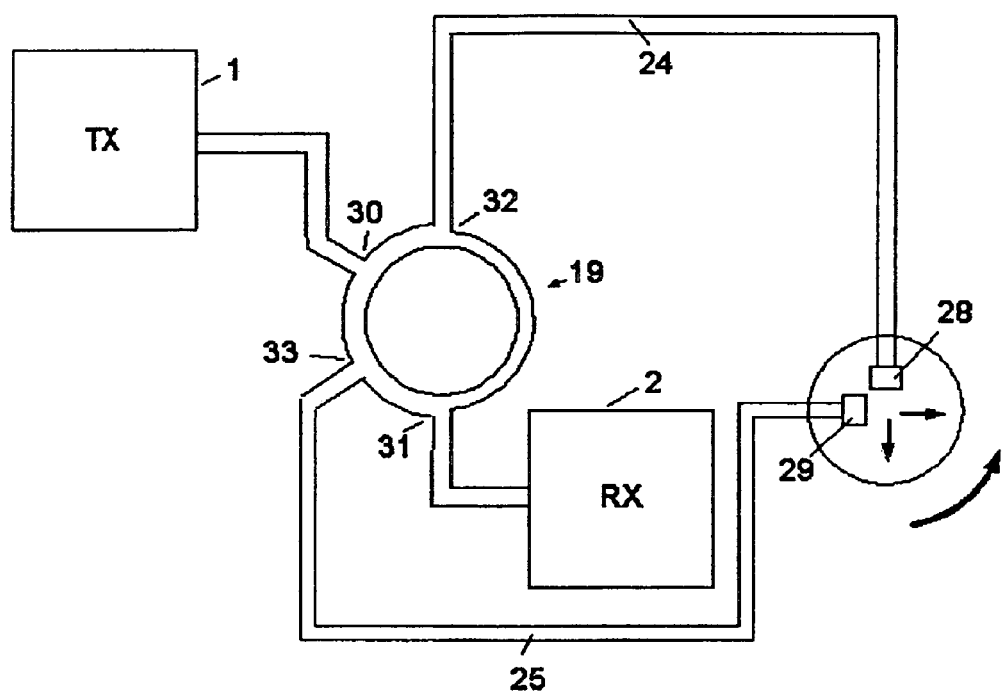
FIG. 5 is a schematic diagram of another embodiment of the microwave circuit arrangement for a radar filling level measuring device including a 180°-ring or rat-race coupler according to the present invention.

A further embodiment of the present invention shown in FIG. 5 is similar in its basic features to the structure of the embodiment in FIG. 4. In the present embodiment, the microwave circuit 1, 2, 19, together with the antenna leads 24, 25 and the couplings 28, 29 may also be arranged on a single printed circuit board, wherein the individual circuit components could of course also be distributed on a plurality of printed circuit boards. Unlike the embodiment illustrated in FIG. 4, in the present case the 3 dB coupler has been realized as a 180° coupler or rat-race coupler. In this coupler configuration, the conductor section between the second terminal, connected to the receiving unit 2 and the third terminal, has a length of $3/4\lambda$. All other conductor sections have a length of $\lambda/4$. The signal generated by the microwave generator 1 and fed into the first terminal 30 is equally divided up between the third and fourth terminals 32, 33, the signal components not obtaining a phase difference one to the other.

In order to generate the phase offset necessary for coupling into the hollow conductor, in the present embodiment the antenna leads 24, 25 are made to have differing lengths so that by superposition a circularly polarized wave may be formed in the hollow conductor. For example, the antenna lead 25 may be longer than the antenna lead 24 by $\lambda/4$. During receiving operation, the reflected waves received with a reversed sense of rotation are received by the couplings 28, 29, the signal component received by the coupling 29 being behind the signal component received at the coupling 28 by 90°. Due to the differing lead lengths, the signal component arriving at the fourth terminal 33, after again passing the antenna lead 25, is 180° behind the signal component of terminal 32, and therefore the signal components amplify each other as desired at the second terminal 31 and eliminate each other at the first terminal.

Figure 6:
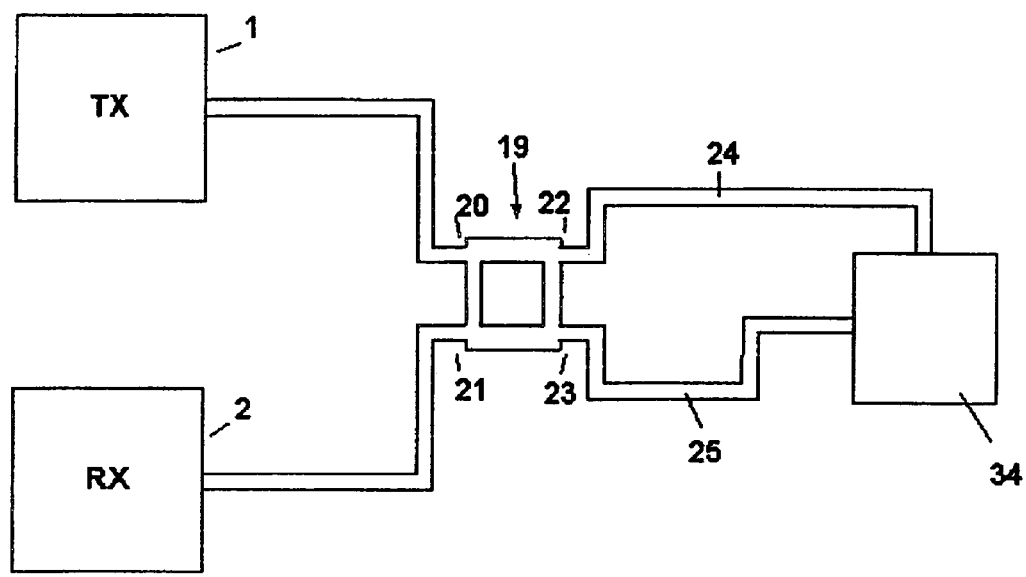
FIG. 6 is a schematic diagram of a further embodiment of the microwave circuit arrangement for a radar filling level measuring device including a patch antenna according to the present invention.

A further embodiment of the present invention is shown in FIG. 6, differing from FIG. 4 essentially by the configuration of the antenna. Instead of a horn antenna fed via a hollow conductor, in the present case a planar or patch antenna is used, the square conductive patch 34 being fed via the two leads 24, 25. The antenna feeds in this case are the two points at which the two leads 24 and 25 are connected to the patch. Due to these two antenna feeding points of the patch on two sides disposed at right angles to one another, two linearly polarized waves having polarization planes at right angles to each other are excited which, by the phase offset of $\lambda/4$ or 90° are superimposed to form a circularly polarized wave. While only one patch is shown in FIG. 6, of course two or more similarly constructed patches may, of course, be connected to form an array and used for generating a circularly polarized wave.

It is of course also possible to combine the 3 dB couplers shown in FIGS. 4, 5 and 6 with an antenna assembly 4'' as shown in FIG. 3 using strip conductor technology. In this case the leads 24 and 25 may be configured as coaxial leads. Furthermore, the individual components of the strip conductor circuits shown in FIGS. 4 and 5 may, of course, also be arranged on more than one printed circuit board. Moreover, the person skilled in the art will also be aware of other 3 dB couplers apart from the exemplary hybrid ring couplers and ring couplers described here. As a matter of principle, all 3 dB couplers with four terminals are suitable. Examples of such well known couplers are line couplers of coupled parallel lines, such as Lange couplers, hybrid couplers, such as rat-race couplers, hybrid ring couplers, branch-line couplers, and hollow conductor couplers, such as so-called two-hole couplers or magic tees.

Figure 7:
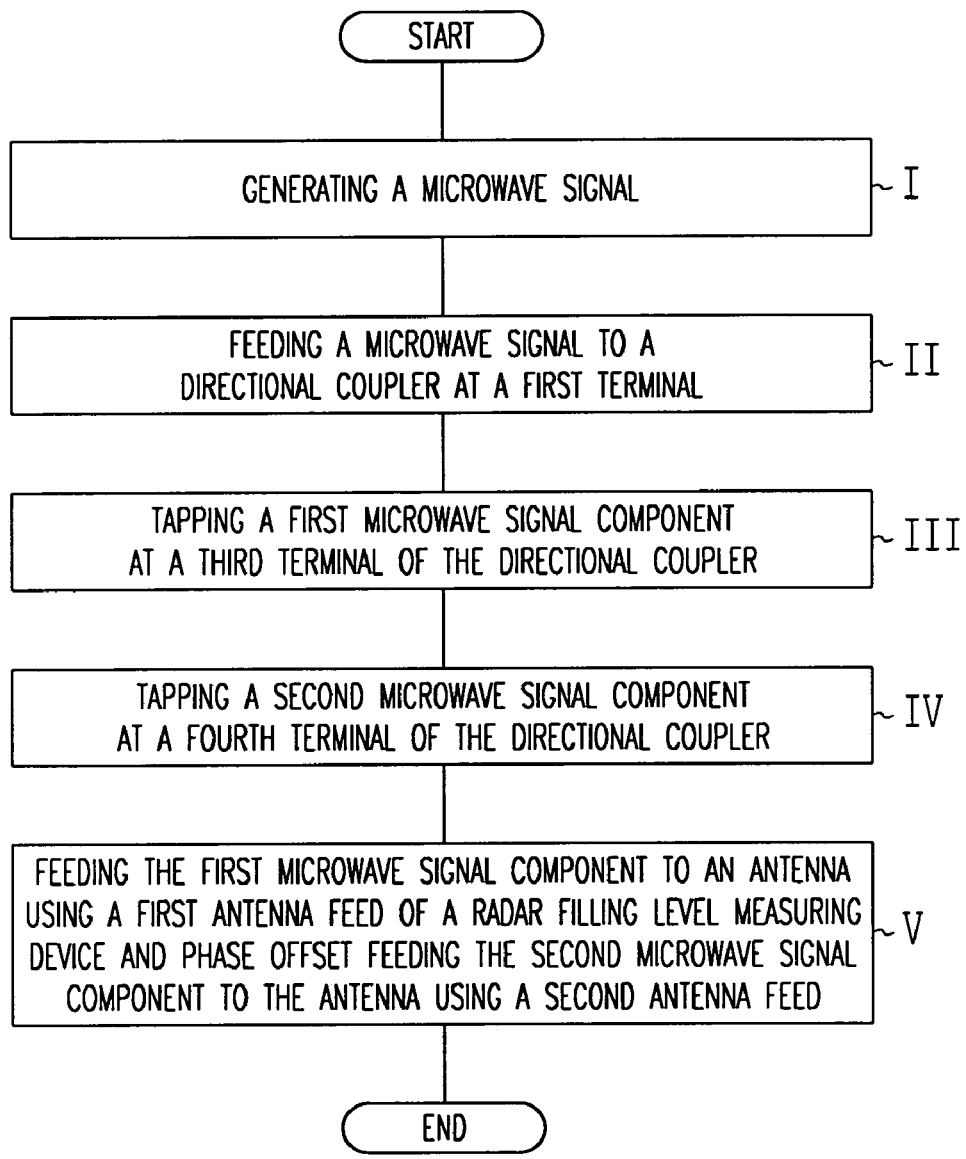
FIG. 7 is a flow chart of the method for generating an elliptically polarized wave according to the present invention.

FIG. 7 shows in a flow chart the individual steps of the method according to the invention for generating an elliptically polarized wave, necessary for the method according to the present invention. In a first process step I, for example, microwave signals of the wavelength λ are generated using a microwave generator 1 having frequencies of about 1 to 100 GHz. Preferred frequency ranges can for example be between 4 and 8 and between 18 and 28 GHz, while microwave signals having other frequencies may of course also be used. In a further process step II, the microwave signal is fed into a directional coupler 19 with four terminals 20, 21, 22, 23, at a first terminal 20. In the case of a 3 dB coupler, the microwave signal thus fed-in is distributed between the third and fourth terminals 22, 23 in first and second microwave signal components. Then the first and second microwave signal components are tapped in third and fourth process steps III, IV at third and fourth terminals, respectively, of the directional coupler, from where the two microwave signal components may be forwarded to first and second antenna feeds 28, 29. Next, in a fifth process step V, the first and second microwave signal components are fed with a phase offset into an antenna 4, where they are superimposed to form an elliptically polarized wave, the first microwave signal component being fed in via a first antenna feed 28, and the second microwave signal component being fed in via a second antenna feed 29 of the antenna 4. According to a particular embodiment, the microwave signal components may be coupled-in with a phase offset of λ/4 forming a circularly polarized wave by being superimposed.

Figure 8:
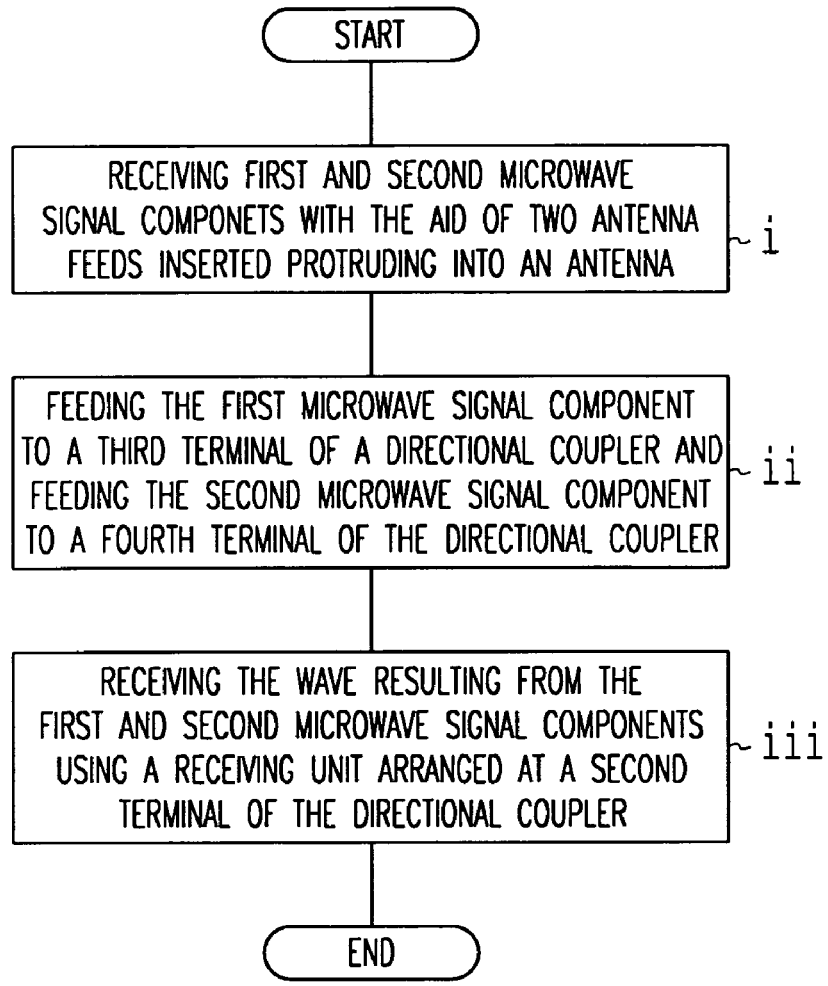
FIG. 8 is a flow chart of the method for receiving an elliptically polarized wave according to the present invention.

Finally the flow chart in FIG. 8 shows the individual process steps necessary for receiving the elliptically polarized wave back after transmitting and after reflection with the same antenna and using the method according to the present invention. In a first process step i, a first and second microwave signal component are received using two antenna feeds 28, 29 inserted protruding into a hollow conductor 5. Next, in a second process step ii, the two received microwave signal components are fed into a directional coupler at third and fourth terminals 22, 23. Finally, a receiving unit 2 disposed at a second terminal 21 of the directional coupler 19 is fed with the microwave signal components fed-in and interfering with one another so that the receiving unit 2 can then further process the microwave signal thus received.

All of the documents, published works and patent applications used in this application are herein incorporated by reference as if each were individually incorporated by reference for any purpose.

Although the foregoing invention has been described and some examples were included by way of illustration on the present invention, it will be ready apparent to those of skill in the art that certain changes and methodological modification may be made thereto without departing from the idea or scope of the subsequent claims.

What is claimed is:

1. A radar filling level measuring device for transmitting and receiving elliptically polarized waves having a wavelength λ, comprising a directional coupler having a first, a second, a third and a fourth terminal, a microwave generator, a receiving unit, and an antenna having first and second antenna feeds, wherein:
the first terminal is coupled with the microwave generator,
the second terminal is coupled with the receiving unit,
the third terminal is coupled with the first antenna feed, and
the fourth terminal is coupled with the second antenna; and
wherein the power of the wave fed from the microwave generator to the first terminal of the directional coupler is divided into halves for each of the third and fourth terminals.

2. The radar filling level measuring device according to claim 1, wherein the directional coupler is a 3 dB coupler.

3. The radar filling level measuring device according to claim 1 or 2, wherein the directional coupler is at least one of a 90° directional coupler or a hybrid ring coupler.

4. The radar filling level measuring device according to claim 2, wherein the wave components have a phase offset at or before the point of feeding into the antenna.

5. The radar filling level measuring device according to claim 1 or 2, wherein the directional coupler is at least one of a 180° directional coupler or a rat-race coupler.

6. The radar filling level measuring device according to claim 1 or 2, wherein the directional coupler is a coupler from the group of directional couplers consisting of line couplers, Lange couplers, branch-line couplers, hybrid couplers, two-hole couplers, magic tee, hollow-conductor couplers and coaxial-line couplers.

7. The radar filling level measuring device according to claim 1 or 2, wherein the waves generated by the microwave generator are in the frequency range of about 1 to 100 GHz.

8. The radar filling level measuring device according to claim 7, wherein the frequencies are in the range of about 4 to 8 GHz.

9. The radar filling level measuring device according to claim 7, wherein the frequencies are in the range of about 8 to 28 GHz.

10. The radar filling level measuring device according to claim 7, wherein the frequencies are higher than about 8 GHz.

11. The radar filling level measuring device according to claim 1, wherein the wave components have a phase offset at or before the point of feeding into the antenna.

12. The radar filling level measuring device according to claim 11, wherein the phase offset is λ/4.

13. The radar filling level measuring device according to claim 1, wherein the directional coupler is adapted to divide the fed-in wave between the third and fourth terminals, from where the wave components are fed with a phase offset into the antenna with the aid of feeds from the first antenna and second antenna and are superimposed to form an elliptically polarized wave, and
wherein the directional coupler is adapted to receive the elliptically polarized wave generated after reflection from the first and second antenna feeds in a pro rata fashion, where waves eliminate each other at the first terminal and maximally amplify each other at the second terminal.

14. A radar filling level measuring device for transmitting and receiving elliptically polarized waves having a wavelength λ, comprising a directional coupler having a first, a second, a third and a fourth terminal, a microwave generator, a receiving unit, and an antenna having first and second antenna feeds, wherein:
the first terminal is coupled with the microwave generator,
the second terminal is coupled with the receiving unit,
the third terminal is coupled with the first antenna feed, and
the fourth terminal is coupled with the second antenna feed; and
wherein the first and second antenna feeds are inserted protruding into the antenna radially offset by an angle to each other.

15. The radar filling level measuring device according to claim 14, wherein the angle is a right angle.

16. The radar filling level measuring device according to claim 15, wherein the directional coupler is a 3 dB coupler.

17. The radar filling level measuring device according to claim 14, wherein the directional coupler is a 3 dB coupler.

18. A radar filling level measuring device for transmitting and receiving elliptically polarized waves having a wavelength λ, comprising a directional coupler having a first, a second, a third and a fourth terminal, a microwave generator, a receiving unit, and an antenna having first and second antenna feeds, wherein:
the first terminal is coupled with the microwave generator,
the second terminal is coupled with the receiving unit,
the third terminal is coupled with the first antenna feed, and
the fourth terminal is coupled with the second antenna feed; and
wherein the first and second antenna feeds each include a hollow conductor coupling.

19. The radar filling level measuring device according to claim 18, wherein the directional coupler is a 3 dB coupler.

20. The radar filling level measuring device according to claim 18, wherein the directional coupler is a 3 dB coupler.

21. A radar filling level measuring device for transmitting and receiving elliptically polarized waves having a wavelength λ, comprising a directional coupler having a first, a second, a third and a fourth terminal, a microwave generator, a receiving unit, and an antenna having first and second antenna feeds, wherein:
the first terminal is coupled with the microwave generator,
the second terminal is coupled with the receiving unit,
the third terminal is coupled with the first antenna feed, and
the fourth terminal is coupled with the second antenna feed; and
wherein the first antenna feed is applied to a first side of a patch and the second antenna feed is applied to a second side of the patch, wherein the first and second sides of the patch are at right angles to one another.

22. The radar filling level measuring device according to claim 21, wherein the directional coupler is a 3 dB coupler.

23. A radar filling level measuring device for transmitting and receiving elliptically polarized waves having a wavelength λ, comprising a directional coupler having a first, a second, a third and a fourth terminal, a microwave generator, a receiving unit, and an antenna having first and second antenna feeds, wherein:
the first terminal is coupled with the microwave generator,
the second terminal is coupled with the receiving unit,
the third terminal is coupled with the first antenna feed, and
the fourth terminal is coupled with the second antenna feed; and
wherein waves divided up between the third and fourth terminals are fed into the antenna of the radar filling level measuring device using the first and second antenna feeds with a phase offset of λ/4, where they are superimposed to form a circularly polarized wave.

24. The radar filling level measuring device according to claim 23, wherein the directional coupler is a 3 dB coupler.

25. A radar filling level measuring device for transmitting and receiving elliptically polarized waves having a wavelength λ, comprising a directional coupler having a first, a second, a third and a fourth terminal, a microwave generator, a receiving unit, and an antenna having first and second antenna feeds, wherein:
the first terminal is coupled with the microwave generator,
the second terminal is coupled with the receiving unit,
the third terminal is coupled with the first antenna feed, and
the fourth terminal is coupled with the second antenna feed; and
wherein the circularly polarized waves generated by the radar filling level measuring device are received after reflection by the first and second antenna feeds and fed into the directional coupler where they eliminate each other at the first terminal and maximally amplify each other at the second terminal.

26. The radar filling level measuring device according to claim 25, wherein the directional coupler is a 3 dB coupler.

27. A radar filling level measuring device for transmitting and receiving elliptically polarized waves having a wavelength λ, comprising a directional coupler having a first, a second, a third and a fourth terminal, a microwave generator, a receiving unit, and an antenna having first and second antenna feeds, wherein:
the first terminal is coupled with the microwave generator,
the second terminal is coupled with the receiving unit,
the third terminal is coupled with the first antenna feed, and
the fourth terminal is coupled with the second antenna feed; and
wherein at least the antenna feed and the directional coupler are arranged on a single printed circuit board.

28. The radar filling level measuring device according to claim 27, wherein the directional coupler is a 3 dB coupler.

29. A radar filling level measuring device for transmitting and receiving elliptically polarized waves having a wavelength λ, comprising a directional coupler having a first, a second, a third and a fourth terminal, a microwave generator, a receiving unit, and an antenna having first and second antenna feeds, wherein:
the first terminal is coupled with the microwave generator,
the second terminal is coupled with the receiving unit,
the third terminal is coupled with the first antenna feed, and
the fourth terminal is coupled with the second antenna feed;
wherein the directional coupler is designed using strip conductor technology and the antenna leads are configured as coaxial leads.

30. The radar filling level measuring device according to claim 29, wherein the directional coupler is a 3 dB coupler.

31. A radar filling level measuring device, for transmitting and receiving elliptically polarized waves having a wavelength λ, comprising a directional coupler having a first, a second, a third and a fourth terminal, a microwave generator, a receiving unit, and an antenna having first and second antenna feeds, wherein:
the first terminal is coupled with the microwave generator,
the second terminal is coupled with the receiving unit,
the third terminal is coupled with the first antenna feed, and
the fourth terminal is coupled with the second antenna feed;
wherein the directional coupler is a 90° directional coupler or a hybrid ring coupler; and
wherein the third and fourth terminals have a distance of $(n+1)*\lambda/4$, wherein: $n=k*2; \kappa \in NU$.

32. The radar filling level measuring device according to claim 31, wherein two adjacent terminals have a distance from one another of $(n+1)*\lambda/4$, wherein; $n=k*2; \kappa \in N$.

33. The radar filling level measuring device according to claim 31, wherein the directional coupler is a 3 dB coupler.

34. A radar filling level measuring device for transmitting and receiving elliptically polarized waves having a wavelength $\lambda$, comprising a directional coupler having a first, a second, a third and a fourth terminal, a microwave generator, a receiving unit, and an antenna having first and second antenna feeds, wherein:
   the first terminal is coupled with the microwave generator,
   the second terminal is coupled with the receiving unit,
   the third terminal is coupled with the first antenna feed, and
   the fourth terminal is coupled with the second antenna feed;
wherein the directional coupler is a 180° directional coupler or a rat-race coupler; and
wherein the first terminal has a distance from the third and fourth terminals and the second terminal has a distance from the fourth terminal of $(n+1)*\lambda/4$ and the second terminal has a distance from the third terminal of $(n+3)*\lambda/4$, wherein: $n=k*2; k\in N$.

35. The radar filling level measuring device according to claim 34, wherein the two leads each connecting one of the third and fourth terminals with one of the antenna feeds, respectively, have a length difference of $(n+1)*\lambda/4$, wherein $n=k*2; k\in N$.

36. The radar filling level measuring device according to claim 34, wherein the directional coupler is a 3 dB coupler.

37. Use of a directional coupler having a first, a second, a third and a fourth terminal in a radar filling level measuring device having a microwave generator, a receiving unit, and an antenna for generating and receiving an elliptically polarized wave having a wavelength $\lambda$, wherein:
   the microwave generator feeds a wave having the wavelength $\lambda$ into the first terminal of the directional coupler,
   the fed-in wave is divided up between the third and fourth terminals, from where the wave components are fed with a phase offset into the antenna with the aid of the first and second antenna feeds and are superimposed to form an elliptically polarized wave, and
   after reflection, the elliptically polarized wave thus generated is received by the first and second antenna feeds and is fed into the directional coupler in a pro rata fashion, where they eliminate each other at the first terminal and maximally amplify each other at the second terminal.

38. Use of a directional coupler for generating an elliptically polarized wave according to claim 37,
   wherein the wave components are fed into the antenna with a phase offset of $\lambda/4$.

39. Use of a directional coupler for generating an elliptically polarized wave according to claim 37,
   wherein the directional coupler used is a 3 dB coupler.

40. Use of a directional coupler for generating an elliptically polarized wave according to claim 39,
   wherein the directional coupler used is a coupler from the group of directional couplers consisting of line couplers, Lange couplers, branch-line couplers, hybrid couplers, hybrid ring couplers, rat-race couplers, two-hole couplers, magic tee, hollow-conductor couplers and coaxial-line couplers.

41. A method for transmitting and receiving an elliptically polarized wave comprising:
   generating a microwave signal having a wavelength $\lambda$,
   feeding a microwave signal into a directional coupler at a first terminal,
   tapping a first microwave signal component at a third terminal of the directional coupler,
   tapping a second microwave signal component at a fourth terminal of the directional coupler,
   feeding the first microwave signal component into an antenna via a first antenna feed of a radar filling level measuring device and, feeding the second microwave signal component into the antenna via a second antenna feed with a phase offset in such a way that an elliptically polarized wave is obtained,
   transmitting the elliptically polarized wave,
   receiving first and second reflected microwave signal components with the aid of two antenna feeds inserted protruding into an antenna, from which microwave signal components the elliptically polarized wave is formed,
   feeding the first microwave signal component to a third terminal of a directional coupler and feeding the second microwave signal component to a fourth terminal of the directional coupler, and
   receiving the wave signals resulting from the first and second microwave signal components using a receiving unit disposed at a second terminal of the directional coupler.

42. The method for transmitting and receiving an elliptically polarized wave according to claim 41,
   wherein the phase offset is generated using a 3 dB coupler.

43. The method for transmitting and receiving an elliptically polarized wave according to claim 41,
   wherein the polarization planes of the first and second microwave signal components fed into the antenna are at right angles to each other.

44. The method for transmitting and receiving an elliptically polarized wave according to claim 42 or 43,
   wherein the phase offset is $\lambda/4$.

45. The method for transmitting and receiving an elliptically polarized wave according to claim 44,
   wherein the generated wave has a circular polarization.

46. The method for transmitting and receiving an elliptically polarized wave according to claim 45,
   wherein the directional coupler is a coupler from the group of directional couplers consisting of line couplers, Lange couplers, branch-line couplers, hybrid couplers, hybrid ring couplers, rat-race couplers, two-hole couplers, magic tee, hollow-conductor couplers and coaxial-line couplers.

47. The method for transmitting and receiving an elliptically polarized wave according to claim 41,
   wherein the phase offset is generated with the aid of the directional coupler.

48. The method for transmitting and receiving an elliptically polarized wave according to claim 41,
   wherein the phase offset is generated by the conductor portions of differing lengths connecting the first and second antenna feeds with the third and fourth terminals, respectively.

49. The method for transmitting and receiving an elliptically polarized wave according to claim 48,
   wherein the length difference is $\lambda/4$.

50. The method for transmitting and receiving an elliptically polarized wave according to claim 41,
   wherein feeding the waves into the antenna is carried out at right angles.

* * * * *